UNITED STATES PATENT OFFICE.

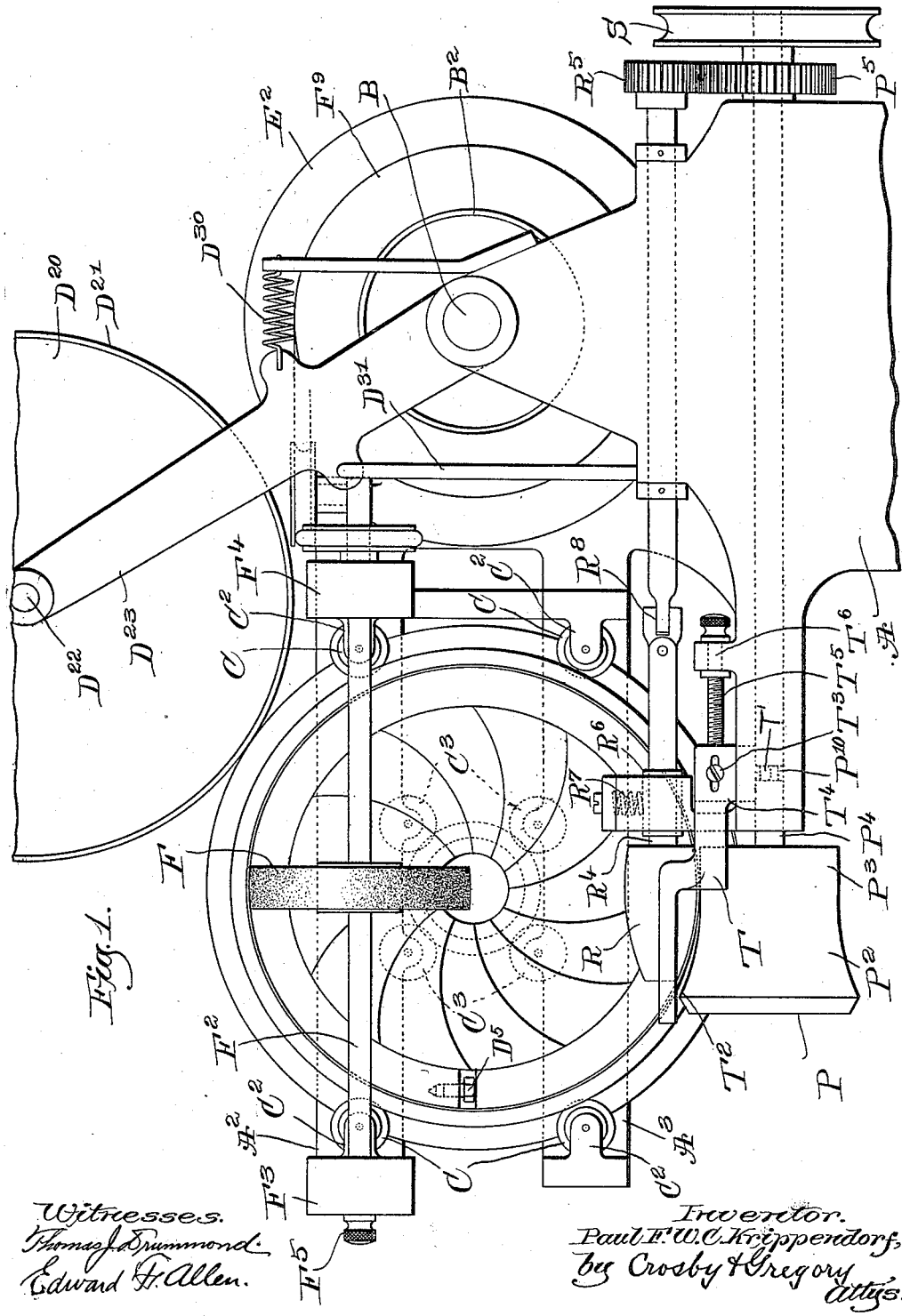

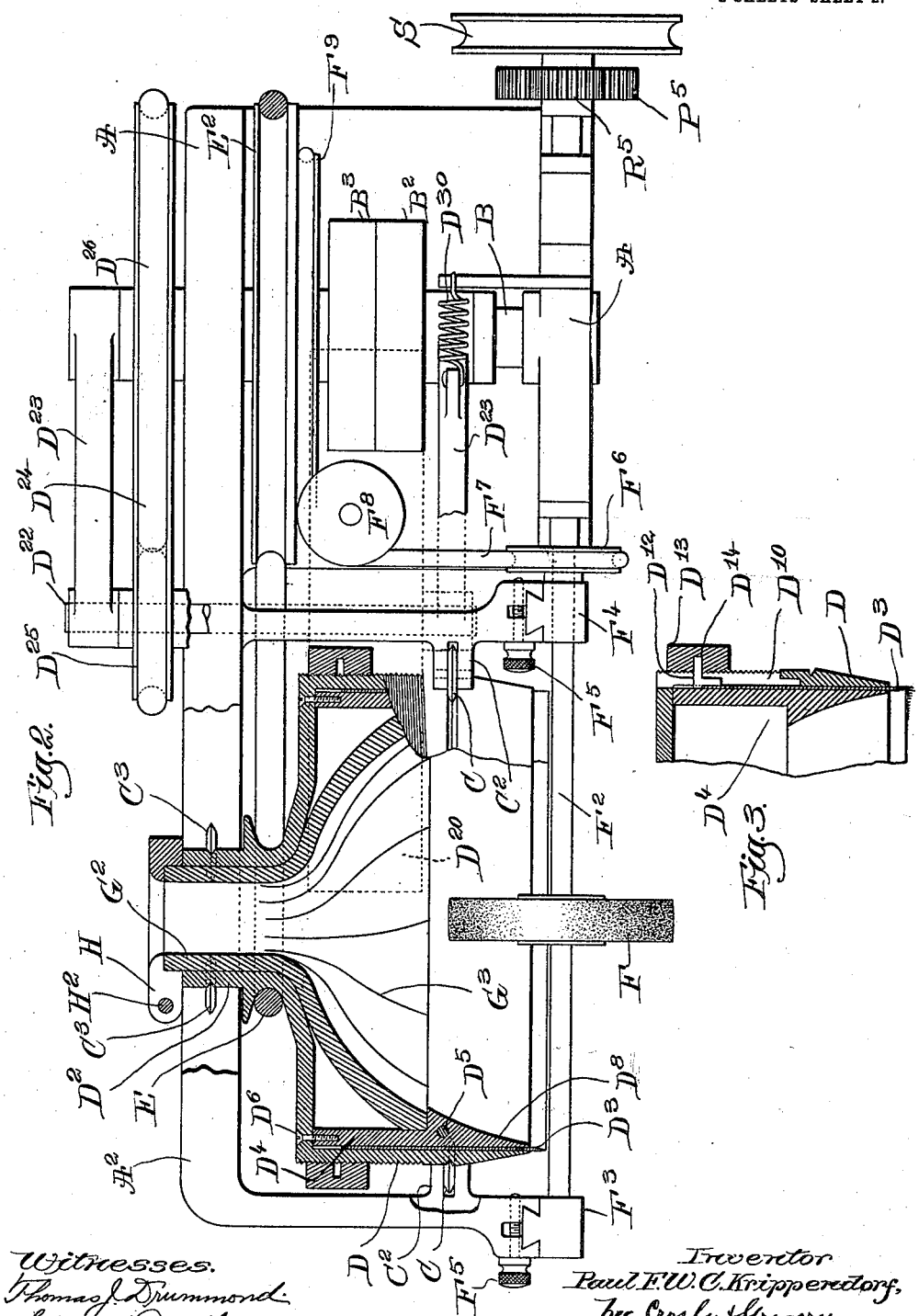

PAUL F. W. C. KRIPPENDORF, OF LYNN, MASSACHUSETTS, ASSIGNOR TO UNITED SHOE MACHINERY COMPANY, OF PATERSON, NEW JERSEY, A CORPORATION OF NEW JERSEY.

SKIVING-MACHINE.

1,106,461.      Specification of Letters Patent.      Patented Aug. 11, 1914.

Application filed April 30, 1908. Serial No. 430,141.

*To all whom it may concern:*

Be it known that I, PAUL F. W. C. KRIPPENDORF, a citizen of the United States, residing at Lynn, in the county of Essex and State of Massachusetts, have invented an Improvement in Skiving-Machines, of which the following description, in connection with the accompanying drawing, is a specification, like letters on the drawing representing like parts.

This invention relates to a machine for skiving leather and similar material, in which the cutting element is constituted as a rotary cylindrical knife.

A feature of the invention is the cutting blade which is made of a thin, flexible strip of steel capable of being readily and cheaply renewed.

Another feature provides for the axial adjustment of the cylindrical cutting blade so that its cutting edge will always remain in the same plane, thus maintaining at all times the proper relation of the cutting blade, the feeding instrumentalities, and the material being skived.

Another feature resides in the means for sharpening the cutting blade and maintaining it in a sharpened condition during the operation of the machine and without interfering therewith.

Another feature resides in the means for adjusting the angle and the width of the skiving, which is secured by this invention in a simple and effective manner for a wide range of work.

Other features of the invention, including the means for discharging the skiving from the machine, the means for supporting and rotating the cutting member and for clamping the cutting blade therein, will appear from the accompanying description and drawings, and will be more particularly pointed out in the appended claims.

The drawings represent the invention in its preferred form as designed in a machine for skiving upper leather.

In the drawings, Figure 1 is a front elevation of the machine with parts broken away. Fig. 2 is a top plan view of the machine with parts broken away and with the cutting member shown in cross-section. Fig. 3 is a detail, partially in cross-section, showing a construction for moving the cutting blade.

The machine comprises a suitable base or supporting framework A, in which is mounted a shaft B, driven from a suitable source of power in any suitable way, as by a belt passing over fast and loose pulleys $B^2$, $B^3$.

The base A carries at its left-hand side two horizontally disposed projecting L-shaped arms $A^2$, $A^3$. These arms, together with the main portion of the base A, carry two sets of guide rolls, the rolls of each set arranged in a circle, and being located in different planes. The rolls C, of one of these sets, are shown as bevel-edged disks mounted in projecting bearings $C^2$. The rolls $C^3$ of the other set are mounted in similar bearings formed in the arms $A^2$, $A^3$, but in a much smaller circle. These two sets of rolls serve to support and guide the cutting member.

The cutting member comprises a cylindrical knife-supporting frame D, of a general cup-shape, opened throughout axially and presenting the rearwardly extending bearing portion $D^2$. This knife-supporting frame is moved in the planes of the supporting rolls, and fits upon and is supported and guided by the said rolls, so that it may be rotated freely and with great speed thereon. For the purpose of so rotating it a belt E is herein shown, passing around a belt groove in the rearward projection $D^2$ and around a grooved pulley $E^2$ mounted on a shaft B.

The cutting blade $D^3$ is constituted as a thin, flexible strip of steel which may be readily bent into cylindrical shape and which is adapted to present a sharp cutting edge. This blade is tempered throughout so that it may be sharpened until the greater portion of it is worn away. It may then be replaced by a similar blade, and thus the cutting edge, which is the essential element of the skiving machine, may be kept in perfect condition and renewed when finally worn out without affecting the remainder of the machine and at a very slight cost.

The cutting blade is placed upon the interior surface of the cylindrical knife-supporting frame D with its edge projecting slightly, and is formed of such a length that its edges abut as closely as possible.

A split cylindrical clamping frame $D^4$ is placed inside of and against the knife and is sprung outward sufficiently to expand it against the knife by means of the expansion screw $D^5$ to clamp and hold the knife firmly in place. This clamping frame is held from axial movement by means of screws $D^6$, passing through slots in the knife-supporting frame D.

A grinding wheel F of emery, carborundum, or other suitable material, and having its periphery convexed to conform to the concave inner edge of the cutting blade $D^3$, is mounted at the upper part of the machine on a transverse shaft $F^2$, carried in bearings $F^3$, $F^4$, vertically adjustable upon the end of the supporting arm $A^2$ and the opposite portion of the framework to which they are clamped by the set-screws $F^5$. The shaft $F^2$ is extended through the bearing $F^4$, and carries a pulley $F^6$, which is driven by a belt $F^7$, passing over idlers $F^8$ to a pulley $F^9$, on the shaft B, and fast to the pulley $E^2$.

As the cutting blade grows dull it is fed forward to the grinding wheel F and immediately and during the progress of the work is sharpened thereby, so that the cutting edge is not only maintained but it is retained in the same vertical plane. When the cutting blade has become worn out or nearly so it is then replaced by a new cutting blade and the same procedure continues. The means herein shown for securing the feeding forward of the cutting blade is as follows: The cylindrical knife-supporting frame D is slotted longitudinally at several points, as at $D^{10}$, and provided with L-shaped bolts $D^{12}$, one leg of which projects against the rearward edge of the blade $D^3$, out through the slot $D^{10}$, and the other leg of which lies along the exterior surface of the blade $D^3$. The exterior surface of the cylindrical knife-supporting frame D is screw-threaded, and a ring $D^{13}$ screw-threaded and provided with an annular groove on its inner surface is mounted thereon with the annular groove $D^{14}$ fitting over the projecting ends of the bolts $D^{12}$. It will thus be seen that upon rotation of the ring $D^{13}$ the blade $D^3$ will be fed forward by the bolts $D^{12}$. The ring $D^{13}$ is rotated at the desired times by a friction pulley $D^{20}$, provided with a friction surface $D^{21}$ of leather or other suitable material, and journaled on a shaft $D^{22}$ mounted in a frame $D^{23}$, pivoted about the shaft B. The shaft $D^{22}$ is driven by a belt $D^{24}$ extending over a pulley $D^{25}$ on said shaft to a pulley $D^{26}$ on the shaft B, and hence the friction pulley $D^{20}$ is constantly in rotation. A spring $D^{30}$ tends to swing the frame $D^{23}$ upwardly, so as to keep the pulley $D^{20}$ out of contact with the ring $D^{13}$. A rod $D^{31}$ extends from the frame $D^{23}$ to any suitable device, such as a treadle, by means of which the frame $D^{23}$ may be depressed at any desired time to bring the friction pulley $D^{20}$ into contact with the ring $D^{13}$, whereupon the cutting blade $D^3$ will be fed forward into contact with the grinding wheel F, whereupon the friction pulley is released, and the cutting blade at once sharpened by the grinding wheel.

The cylindrical knife-supporting frame carries in the interior thereof a funnel-shaped member whose purpose is to secure the ejection of the skivings. This cup-shaped member G has a hollow projecting axial portion $G^2$ fitting the portion $D^2$ of the knife-supporting frame. The body portion of the funnel member G is concaved or cup-shaped and its surface is a prolongation of a similar concaved or curved face $D^8$ upon the interior of the clamping frame $D^4$. The inner surface of the funnel member G is provided with a series of deflecting blades $G^8$, which serve to catch the skivings and direct them up through the axial opening out at the back of the machine. This funnel member G is in frictional contact with the knife-supporting frame and is consequently rotated thereby, but as its rapid rotation would cause the entanglement of the skivings and prevent their ready ejection a braking device H is provided which is attached to the supporting arms $A^2$, $A^3$, and which is clamped with an adjustable degree of pressure by means of the set-screw $H^2$, against the projecting portion $G^2$ of the funnel-shaped member, so as to materially retard its rotation and allow the skivings to be fed slowly out through the axial opening.

The leather or material to be skived is fed to the cutting knife by means of a pair of feeding rolls, both of which are preferably positively driven. In the construction shown the lowermost of these feeding rolls P has a concave periphery $P^2$, the arc of curvature of which may have the same but preferably has a slightly larger radius than that of the circular cutting edge of the knife. This concave portion $P^2$ of the periphery terminates in a cylindrical portion $P^3$. The feeding roll P is mounted on a horizontal shaft $P^4$, so that the feeding roll is directly below and its periphery is in alinement with the cutting edge. The feeding roll P with its shaft $P^4$ extends transversely of the cutting knife, and the shaft $P^4$ is extended through the base of the machine and carries at its rear end a gear $P^5$. The other feeding roll R is provided with a convexed periphery of the same curvature as that of the cutting knife, and is mounted interiorly of the cutting knife upon a shaft $R^4$ extending parallel to the shaft $P^4$ and provided with a gear $R^5$ intermeshing with the gear $P^5$.

It is desirable that the faces of the feeding rolls shall be substantially parallel at all stages of the adjustment of the rolls. In the construction illustrated this result is substantially secured by mounting the left end of the shaft $R^4$ in a vertically and angularly movable yielding bearing $R^6$, held downwardly by a spring $R^7$, and by placing a universal joint $R^8$ in the shaft. The feeding rolls are driven by a pulley S, mounted on the shaft P⁴ and connected to any ordinary form of transmitter by which the speed thereof may be controlled.

A gage T for gaging the edge of the leather, V-shaped in cross-section to fit in the bight of the rolls P and R and provided with an extending guard arm T², to prevent the leather from being caught by the knife beyond the skiving portion, is adjustably mounted by means of a screw T³ on a block T⁴, which in turn is slidably mounted in the framework A. The block T⁴ has screw-threaded therein an adjusting screw T⁵, mounted in a projection T⁶ from the frame A, so that upon turning the adjusting screw T⁵ the gage T may be adjusted transversely of the knife and in line with the feed rolls.

The shaft P⁴ is longitudinally movable in its bearings and provided with a groove P¹⁰, into which a pin T¹ from the block T⁴ projects, so that the feed roll P is likewise adjusted longitudinally upon the movement of the adjusting screw T⁵. In this way the angle of the skiving may be varied. It will be seen that upon the movement of the feed roll P longitudinally the curved wedge-shaped opening between the feed rolls P and R will be enlarged, so that a more blunt skiving will be cut as the feed roll P is moved outwardly. Usually it is desired to have the skived portion of the same width, and for this reason the adjustment of the gage T with the feed roll P has been provided for, but as the gage T is independently adjustable upon the block T⁴ any desired width of skiving may be secured.

The operation of the machine will be apparent from the foregoing description. The feed roll P is adjusted by means of the screw T⁵ until the desired angle of the skiving is obtained and the gage T is adjusted to present the desired width of skiving. The knife edge if not sufficiently sharp is made so by depressing the frame D²³ and feeding forward the knife against the grinding roll until it is sharpened. The leather to be skived is then introduced between the feed rolls, the roll R yielding for that purpose, and the edge of the leather is guided against the gage T. The leather is at once fed through the machine by the feed rolls, the knife cutting off the skiving which is seized by the slowly revolving blades of the funnel member G and fed out through the axial opening thereof.

Having described my invention, what I claim as new and desire to secure by Letters Patent, is:

1. A skiving machine comprising a cylindrical rotary knife, and means for rotating it, a pair, one convex and one concave, of coöperating feed rolls mounted transversely of and adjacent to said knife, an edge gage normally located at the minimum section line of the concave feed roll, means for adjusting said gage and said concave feed roll together transversely of the knife to vary the angle of the skiving.

2. A skiving machine comprising a cylindrical rotary knife, and means for rotating it, a pair, one convex and one concave, of coöperating feed rolls mounted transversely of and adjacent to said knife, an edge gage normally located at the minimum section line of the concave feed roll, means for adjusting said gage and said concave feed roll together transversely of the knife to vary the angle of the skiving, and means whereby said gage may be independently adjusted longitudinally of said feed roll.

3. A skiving machine comprising a cylindrical rotary knife and means for rotating it, a feeding roll mounted transversely of, within and adjacent to the edge of said knife and having a convex periphery conforming to said knife edge, a second feeding roll coöperating with the first and mounted transversely of, without and adjacent to the edge of said knife and having a concave periphery whose curvature is on a slightly greater radius than that of the knife edge, and means for longitudinally adjusting said concave feed roll transversely of the knife to vary the angle of the skiving.

4. A knife for skiving or other machines comprising a cylindrical knife supporting frame constructed to rotate about the axis of the frame, a cyclindrical blade fitting within the frame, and clamping means within the blade for clamping it to the frame.

5. A knife for skiving or other machines comprising a cylindrical knife supporting frame, a cylindrical blade fitting within the frame, and expansible clamping means within the blade for clamping it to the frame.

6. A knife for skiving or other machines comprising a knife supporting frame, a cylindrical blade fitting within the frame, an interior support for the knife blade, and means for adjusting the blade relatively to both the frame and support while in position between them.

7. A skiving machine comprising a cylindrical axially opened knife-supporting frame, rolls mounted exteriorly thereof for supporting and guiding said frames, means for rotating said frame on said rolls, a discharging funnel in and loosely supported by said frame and rotatable thereby, and means for retarding the rotation of said funnel.

8. A skiving machine comprising a cylindrical axially opened knife-supporting frame, rolls mounted exteriorly thereof for supporting and guiding said frame, means for rotating said frame on said rolls, a discharging funnel in and loosely supported by said frame and rotatable thereby, means for retarding the rotation of said funnel, and guiding blades on the surface of said funnel to direct the skiving out through the axial opening.

9. A skiving machine comprising a cylindrical knife-supporting frame, and means for rotating it, a thin, flexible cutting blade, and means for clamping it to said supporting frame to present a circular projecting cutting edge, a grinding wheel mounted transversely of said knife and having its periphery conforming to the curve of said knife edge, means for rotating said grinding wheel, a ring mounted on the exterior of said knife-supporting frame to move axially thereof when rotated thereupon, means for rotating said ring when desired, connections between said ring and said blade whereby upon the rotation of the ring the blade is projected against the grinding wheel.

10. A skiving machine comprising a rotary cylindrical knife, a feed roll mounted outside the knife edge, a coöperating presser arranged on the opposite side of the knife edge, an edge gage, and means for adjusting the gage and roll together transversely of the knife to vary the angle of the skiving.

11. A skiving machine comprising a rotary cylindrical knife, a feed roll mounted in fixed relation to the knife edge to determine the bevel of the skiving, a yielding presser on the opposite side of the knife edge, an edge gage, and means for adjusting the gage and roll together transversely of the knife to vary the angle of the skiving.

12. A skiving machine comprising a rotary cylindrical knife, a feed roll mounted in fixed relation to the knife edge to determine the bevel of the skiving, a yielding presser on the opposite side of the knife edge, means for adjusting the gage and roll together transversely of the knife to vary the angle of the skiving, and means whereby said gage may be independently adjusted longitudinally of said feed roll.

13. A skiving machine comprising a rotary cylindrical knife, a feed roll outside of the knife having a cylindrical end adjacent the edge of the work and a concave end on the work side of the cylindrical end, the smaller diameter of which joins the cylindrical portion of the roll, a presser on the opposite side of the knife edge, and means for adjusting the roll transversely of the knife to vary the angle of the skiving.

14. A knife for skiving machines, having, in combination, a cylindrical blade, a cylindrical holder within which the blade fits, an interior support fitting within the blade, and means for effecting axial adjustment of the blade relatively to both the interior support and holder while in position between them.

15. A knife for skiving machines, having in combination, a cylindrical blade, a cylindrical holder within which the blade fits, an expansible clamping ring fitting within the blade, means for effecting axial adjustment of the blade relatively to both the holder and clamping means, and devices for expanding the clamping ring to secure the blade in adjusted position.

16. A knife for skiving machines, having, in combination, a cylindrical blade, a cylindrical holder within which the blade fits, an interior supporting ring fitting within the blade, and a blade adjusting ring movable relatively to both the holder and supporting ring while the blade is in position to adjust the blade axially.

In testimony whereof, I have signed my name to this specification, in the presence of two subscribing witnesses.

PAUL F. W. C. KRIPPENDORF.

Witnesses:
    MABEL PARTELOW,
    THOMAS J. DRUMMOND.

---

Copies of this patent may be obtained for five cents each, by addressing the "Commissioner of Patents, Washington, D. C."